June 14, 1938.  J. SACHS  2,120,574

ELECTRIC METER CONNECTION APPLIANCE

Filed Feb. 13, 1935  3 Sheets-Sheet 1

Inventor
Joseph Sachs
By S. Jay Teller
Attorney

June 14, 1938.  J. SACHS  2,120,574
ELECTRIC METER CONNECTION APPLIANCE
Filed Feb. 13, 1935   3 Sheets-Sheet 2
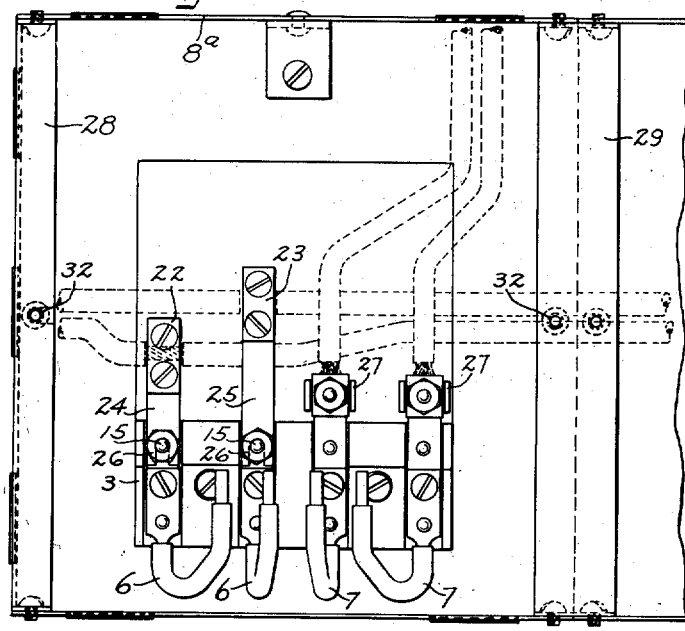
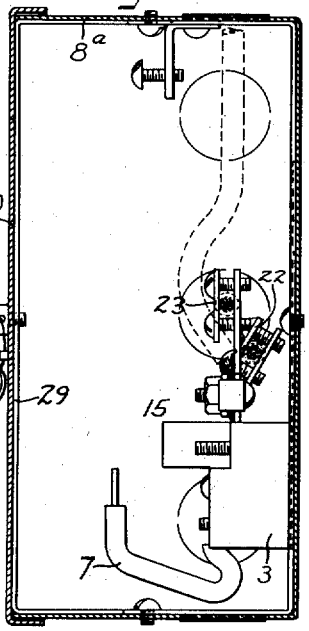
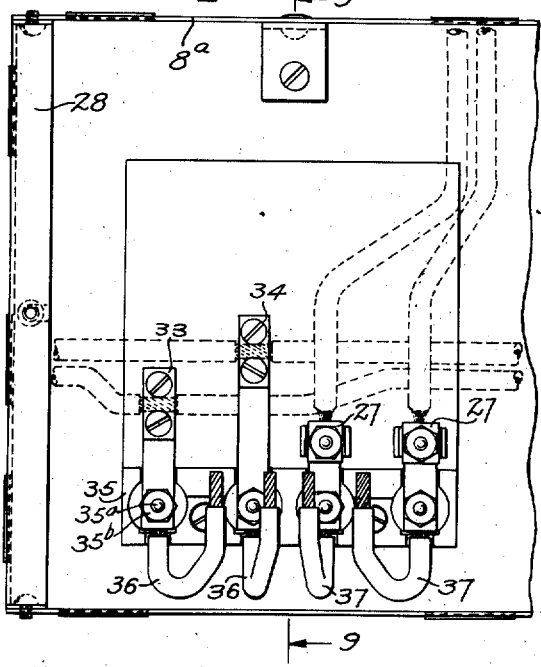
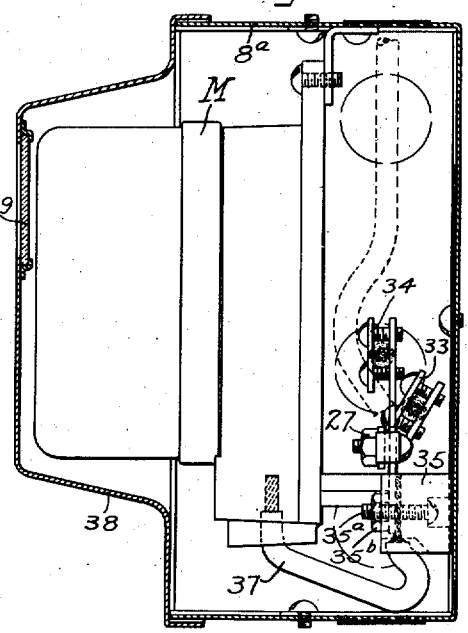
Inventor
Joseph Sachs
By S. Jay Teller
Attorney June 14, 1938. J. SACHS 2,120,574
ELECTRIC METER CONNECTION APPLIANCE
Filed Feb. 13, 1935  3 Sheets-Sheet 3

Inventor
Joseph Sachs
By S. Jay Teller
Attorney

Patented June 14, 1938

2,120,574

UNITED STATES PATENT OFFICE 2,120,574

ELECTRIC METER CONNECTION APPLIANCE

Joseph Sachs, West Hartford, Conn., assignor to Colt's Patent Fire Arms Manufacturing Company, Hartford, Conn., a corporation of Connecticut Application February 13, 1935, Serial No. 6,405

6 Claims. (Cl. 247—2)

Many different types of devices have been devised, constructed and used for providing electrical connections between an electric meter and the line and load wires with which it is associated. These devices have included terminals for the connection of line wires and load wires, and have included conductors, or at least means for the attachment of conductors, leading to the terminals of the meter. Many of these devices have also included switching means, or fuses, or both for interrupting or limiting the current, and some of them have also included specially provided elements or accessories for facilitating the testing of the meter without removing it.

With meters of the conventional type having their terminals at one end, usually the lower end, it has been the usual prior practice to place the meter in vertical register with the connection device, ordinarily above it, and to provide conductors extending in a generally vertical direction between the said meter and the said device. Ordinarily, the connection device, whether including a switch, or a fuse, or both, or neither, has been enclosed in a protective casing, and in many instances the same casing has served to enclose at least the terminal chamber part of the meter so as to prevent unauthorized access to the conductors extending between the connection device and the meter. The arrangement, wherein the meter is vertically spaced from the connection device, has the advantage that the connection device is readily accessible when the front cover of the enclosing casing is opened, but it has the disadvantage that the vertical dimension of the total assembly is in some instances objectionably large.

With the meter above the connection device, as is usual, space must be provided within the enclosing casing and beneath the connection device for the line wires or the load wires or for both. This necessity for wiring space in the casing has still further increased the vertical dimension of the total assembly.

Until recently it has been ordinarily regarded as sufficient for the casing which encloses the connection device to enclose merely the terminal chamber portion of the meter, but it is an increasingly prevalent requirement that the casing shall enclose and surround the entire main body of the meter. In accordance with this more recent practice, the front portion of the meter projects through an opening in the front cover of the casing, or the front cover is extended to entirely enclose the meter and is provided with a window through which the dials of the meter are visible. Obviously, with the meter and the connection device arranged in the before mentioned conventional relationship a very large and expensive casing would be necessary in order to enclose both of them and also provide the necessary wiring space.

The general object of the present invention is to provide a meter connection device or appliance which avoids the excessive and sometimes seriously objectionable height of the conventional arrangement, and which with little or no added expense complies with the present requirements as to the complete enclosing of the main body of the meter. In accordance with the present invention the meter is normally positioned at the front of the casing with at least the terminals thereof within the casing, and the meter is connected with the connection device in such a manner that when necessary it may be moved forward to at least partly expose the connection device. In each embodiment of the invention as shown, the meter may be moved forward without interrupting any electrical connections. It is only necessary for the vertical dimension of the enclosing casing to be a little larger than that of the meter itself, as the required wiring space is provided behind the meter.

In the accompanying drawings I have shown several embodiments of the invention, but it will be understood that the drawings are intended for illustrative purposes only and are not to be construed as defining or limiting the scope of the invention, the claims forming a part of this specification being relied upon for that purpose.

Of the drawings:

Fig. 6 is a view similar to Fig. 1, but omitting the meter and showing an alternative embodiment of the invention. This view also shows how two similar casings may be joined.

Fig. 7 is a side view of the parts shown in Fig. 6, the casing being shown in vertical section.

Fig. 8 is a fragmentary view similar to Fig. 6, and showing another alternative embodiment of the invention.

Fig. 9 is a vertical sectional view taken along the line 9—9 of Fig. 8, and also showing an alternative cover for the casing.

Figure 1:
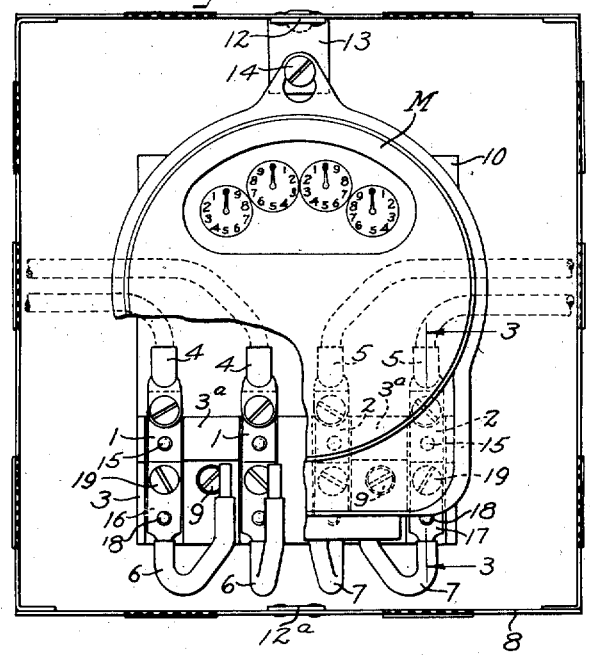
Fig. 1 is a front view of an appliance embodying the invention, with the meter in place. In this view the front cover of the casing is omitted and a portion of the meter is broken away to more clearly show portions of the connection device.

In accordance with the invention, as shown particularly in Figs. 1 to 5, there are provided conducting elements connectible to stationary circuit wires. Preferably there are two conducting elements 1 connectible to stationary line wires and two other conducting elements 2 connectible to stationary load wires. Portions of at least two of these elements are held in fixed relationship to a rear supporting wall and preferably portions of all four of them are so held. Ordinarily the said elements are carried by an insulating block 3, and they have wire terminals such as 4 and 5. Provision is made for electrically connecting the conducting elements or conductors 1 and 2 with the respective meter terminals. This electrical connection may be effected in various ways, but as shown there are conducting means 6 and 7 which are carried by the block 3 and electrically connected with the respective conductors 1 and 2. These conducting means 6 and 7 are electrically connectible with the several terminals of a meter such as that indicated at M. It will of course be understood that the invention is not necessarily limited as to any particular details of meter design or construction.

The block 3 is secured to the rear wall of an enclosing casing 8, as for instance by means of screws 9, 9. An insulating sheet 10 may be provided at the rear of the block, this sheet extending upward along the rear wall of the casing.

The casing 8 may vary as to size and shape, but it is preferably relatively small, its vertical dimension being not greatly in excess of the vertical dimension of the largest meter with which the appliance is to be connected. As shown, the casing 8 is approximately square and its side and end walls are permanently connected with each other, by welding or otherwise. As to this latter feature, I do not limit myself, as will be presently explained. The casing 8 is provided with the usual conduit knockouts, as shown.

The front cover 11 of the casing may be held in various ways, but as shown it is provided with slots at the top and bottom through which project tongues 12 and 12ᵃ on the top and bottom walls of the casing. The tongues 12 and 12ᵃ have openings therein through which can be inserted suitable locks or seals.

Means is provided for releasably supporting or holding a meter, such as M, adjacent the conducting elements 1 and 2 and adjacent the block 3. The relationship between the meter and the block is such that a substantial portion of the block is positioned between horizontal planes through the top and bottom of the meter. As shown the block 3 is directly behind the meter.

The supporting or holding means for the meter may be widely varied as to details to suit different types of meters. The said means is preferably carried at least in part by the insulating block, and it preferably also includes two manually disconnectible parts entirely within the casing and separate from the cover. As shown the supporting or holding means comprises an attachment lug on the top of the meter and a bracket 13 secured to the top wall of the casing near the rear. Carried by the bracket 13 is a screw 14 adapted to extend through an inverted keyhole slot in the said lug at the top of the meter. The meter holding means also includes integral lugs 3ᵃ, 3ᵃ carried by and projecting forward from the block 3. The meter holding means thus includes not only the meter lug and the bracket 13, but also the lugs 3ᵃ, 3ᵃ carried by the block 3.

The plane of the main portion of the cover 11 is at the front of the terminals of the meter M, and the said cover is adapted to cooperate with the particular meter with which the device is to be used. When several different meters are in use different interchangeable covers are provided for the respective meters. As shown, the cover 11 has an opening 11ᵃ therein which is of such diameter as to approximately fit the forward projecting portion of the meter M. It will be seen that when the cover 11 is in place the meter is at least partly supported or held by the bracket 13 and the screw 14 and is also held in place by the lugs 3ᵃ on the block 3. The meter may also be held to some extent by the cover 11. When the cover 11 is removed and the screw 14 is loosened, the meter may be lifted slightly and then moved forward out of the normal position shown in Fig. 2.

Figure 3:
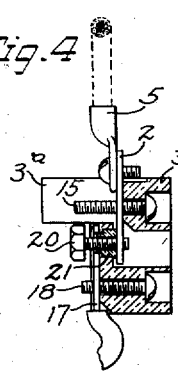
Fig. 3 is a fragmentary vertical sectional view taken along the line 3—3 of Fig. 1.

The several conducting elements 1 and 2 may be permanently connected electrically with the respective conducting means 6 and 7, but to facilitate meter testing it may be desirable to provide means whereby they may be readily disconnected. As shown, the conducting elements 1 and 2 are held in place on the block 3 by forward extending screws 15. The conducting means 6 and 7 include portions 16 and 17 which are held in place on the block 3 by forward extending screws 18. The conducting elements 1 and 2 are out of alignment with the conducting portions 16 and 17 and overlap them, and they are connected by screws 19. Each electrical connection is normally through the screw but by backing out the screw, as shown in Fig. 3, the connection may be broken. The screws 15 may be extended toward the front as shown to provide means for the convenient attachment of by-pass connections, although by-pass connections may be otherwise effected if desired.

Figure 4:
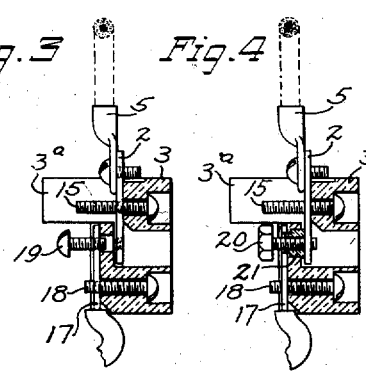
Fig. 4 is a view similar to Fig. 3, but showing an alternative detail.

An alternative disconnecting means is shown in Fig. 4. A screw 20 is provided which is threaded in the conductor 2 but it is not threaded in the conducting portion 17ᵃ. An insulating bushing 21 prevents electrical contact between the body of the screw and the sides of the hole through the conductor 17ᵃ. When the screw 20 is in its rearmost position its head engages the front face of the conductor 17ᵃ, but when the screw is partly backed out, as shown in Fig. 4, the connection is broken.

With the meter M in normal position the conducting means 6 and 7 are located entirely within the casing 8 and behind a plane through the front edges thereof. They extend directly from the block 3 to the terminals of the meter, and they remain in normal mechanical and electrical connection with the block and its terminals when the meter is moved forward. As shown the said conducting means are free from any direct support upon the openable front cover 11. The construction of the said conducting means is such that they are adapted to permit the meter to be freely moved forward without any preliminary or preparatory manipulation of or disconnection of the said conducting means. As shown, the said conducting means have their forward end portions movable relatively to the conductors 1 and 2 so as to permit the meter to be moved forward while maintaining the normal electrical connections therewith. As also shown, the meter in moving forward may have an angular or swinging movement to a position at an angle to its normal position as indicated in Fig. 5.

Figure 5:
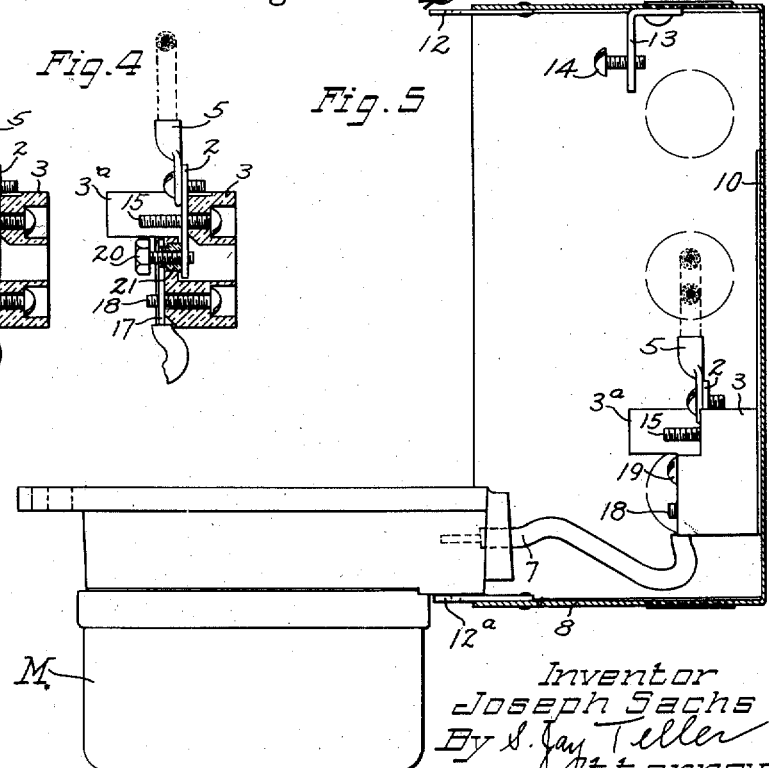
Fig. 5 is a view similar to Fig. 2, but showing the cover of the casing removed and showing the meter moved to a position wherein the front of the connection block is exposed.

To more readily permit angular or swinging movement of the meter to the position shown in Fig. 5, the meter terminals are at the bottom of the meter and the flexible conducting means 6 and 7 are connected to the block 3 at points which are adjacent an horizontal plane through the bottom of the meter. Thus the two ends of each of the flexible conducting means are normally at approximately the same level and this permits the use of shorter conducting means than would otherwise be necessary and also facilitates the forward and downward swinging movement.

As shown in Figs. 1 to 5, the said conducting means 6 and 7 are flexible and can be flexed or bent to permit the meter to be moved as aforesaid while maintaining the electrical connections with the meter. Each flexible conductor 6 and 7 is shown as being formed integrally with the corresponding conducting portions 16 and 17 and is enclosed in a tube of insulating material. The flexible conductors are of sufficient strength to assist in supporting the meter in its forward position.

In originally installing the appliance, the casing can be mounted upon its support in the usual way, and prior to the installation of the meter the service and load wires can be connected with the terminals 4 and 5, as indicated for instance in Fig. 1. Conduits for the wires may be connected at any of the knockouts and the positions of the conduits and of the wires may obviously be varied to suit the requirements of the particular installation. It will be observed that the line and load wires are behind the meter position and above the block 3, so that wiring space is provided without any increase in the vertical dimension of the casing 8.

Figure 2:
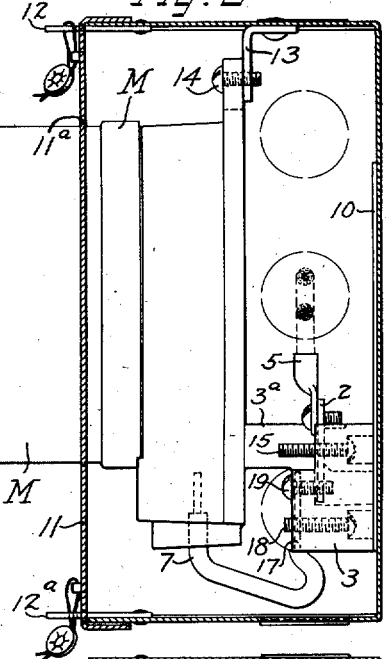
Fig. 2 is a side view of the parts shown in Fig. 1, the enclosed casing with its cover being shown in vertical section.

After the line and load wire connections have been made, the conductors 6 and 7 can be connected with the meter terminals. When the conductors 6 and 7 are flexible, the meter may be in an angular position while such connections are being made, and then the meter can be moved to its normal vertical position, as shown in Fig. 2, and can be secured in place by means of the screw 14. Thereafter the cover 11 can be put in place and locked or sealed. It will be observed that with the described arrangement the entire installation, including the meter and the meter connection appliance, is very compact and has a minimum vertical dimension. The enclosing casing is much smaller than it would be if the meter were arranged in conventional relationship with the connection device. The casing, when closed and sealed, gives effective protection against theft of current.

In the event that it becomes necessary or desirable to obtain access to the connection device or to the wires connected therewith, such access can be readily had by removing the cover 11 and then releasing the meter from the screw 14 and moving it to a position wherein the block 3 and the said wires are exposed at the front. Fig. 5 shows the meter swung angularly to an approximately horizontal position wherein the block and wires are exposed and wherein the meter is at least partly outside of the casing. It will be observed that the electrical connections with the meter are maintained notwithstanding the movement thereof.

If meter testing is to take place, by-pass connections to avoid interruption of the load circuit may be put in place in any convenient way, as for instance by attachment to the forward projecting screws 15, 15. Thereafter any one or all of the meter terminals can be electrically disconnected by withdrawing one or more of the screws 19, as shown in Fig. 3, or one or more of the screws 20 as shown in Fig. 4. At the conclusion of testing the normal circuit connections are restored, the meter is returned to its normal position, and the cover is put back in place.

The construction shown in Figs. 6 and 7 is similar to that shown in Figs. 1 to 5 but differs therefrom in several details. Instead of providing solder lug terminals closely adjacent the block, bussing terminals 22 and 23 are provided, which are mounted on conducting straps 24 and 25 of different lengths. These terminals are adapted to be clamped onto bared portions of bussing wires which extend entirely through the casing from side to side thereof. Preferably, the straps 24 and 25 are slotted at the bottom to fit over the corresponding screws 15 on the block. The screws 15 are provided with nuts 26 which hold the straps in place. This construction makes it possible for the terminals 22 and 23 to be first connected with the bussing wires and thereafter with the block 3. It will be obvious that straps 24 and 25 may be bent, if desired, as indicated in Fig. 7.

In lieu of the solder lugs 5 for the load wires I have shown solderless connectors 27, 27 which are adapted to suitably clamp the strands of the load wires.

The construction shown in Figs. 6 and 7 differs additionally from that shown in Fig. 1 in that the side walls 28 of the casing 8ª are not permanently connected in place but are readily removable. Fig. 6 shows the left hand wall 28 in place, but in lieu of a wall at the right there is shown a portion of another similar casing, the two casings being connected by a junction member 29. With a casing construction such as shown in Figs. 6 and 7 the front cover 30 may be held in place by means of screws 31 entering holes 32 either in the front flanges of the side walls 28 or in the junction member 29. It will be understood that two or more similar casings, with their associated connection devices and meters, can be connected in horizontal series, and that a single set of bussing wires will serve for all appliances.

The construction shown in Figs. 8 and 9 differs from either of the constructions heretofore shown and described in that no special disconnecting elements are provided for convenience in testing. The conducting straps of the bussing terminals 33 and 34 are secured directly to the block 35 by means of screws 35ª. The flexible conductors 36 and 37 connectible with the meter are standard insulated wires instead of the special flat conductors shown in the other figures. These wires are held in place by means of nuts 35ᵇ on the screws 35ª.

If it is desired to test a meter connected to the device shown in Figs. 8 and 9, by-pass connections can be attached in any convenient way, as for instance directly to the terminals 33, 34, 27, 27. Any one or all of the meter terminals can be electrically disconnected by special disconnecting means provided in the meter itself, or by withdrawing one or more of the flexible conductors.

Fig. 9 shows a cover 38 which differs from the cover 11 shown in Fig. 2, or the cover 30 shown in Fig. 7, in that it is domed at the front to entirely enclose the front portion of the meter. The cover 38 has a transparent window at 39 through which the dials of the meter are visible. Notwithstanding the provision of the forward projecting portion to enclose the front of the meter, the main plane of the cover 38 is to be regarded as being the plane of that portion of the cover which directly engages the front of the casing.

Figure 10:
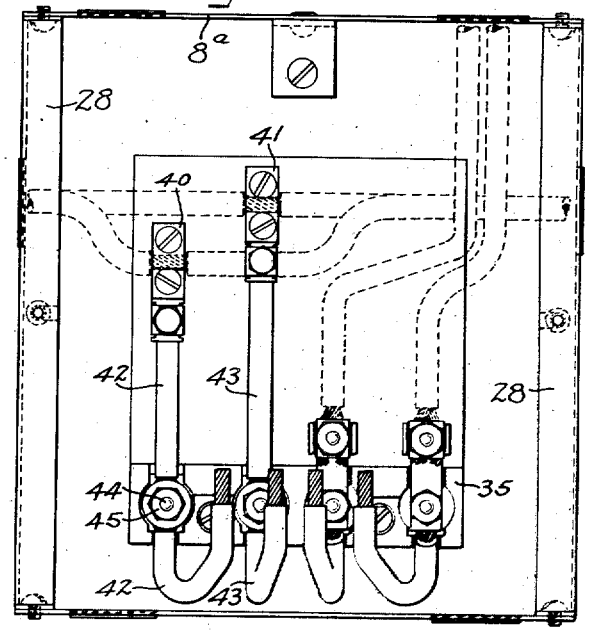
Fig. 10 is another view similar to Fig. 6 and showing another alternative embodiment of the invention.
Figure 11:
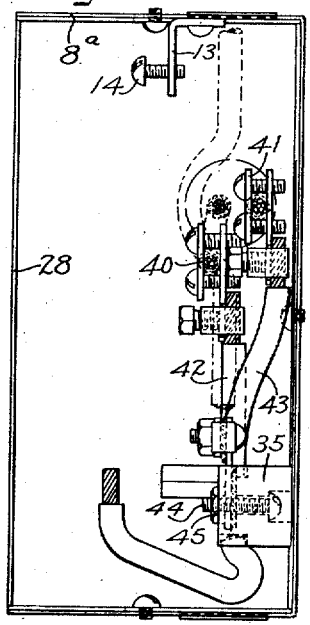
Fig. 11 is a side view of the parts shown in Fig. 10, the casing being shown in vertical section.

The construction shown in Figs. 10 and 11 is similar to that shown in Figs. 8 and 9. However, the bussing wire terminals 40 and 41, instead of being mounted upon conducting straps, as shown in Figs. 8, are mounted upon extensions of the same flexible wires 42 and 43 which are connected with the meter. Each of these wires has its insulation removed between the ends and the strands of the wire are separated to receive a screw 44. A nut 45 on the screw 44 engages the wire to hold it in place on the block 35. It will of course be understood that it is not essential that the insulation be removed to receive screws such as 44 carried by an insulating block. If desired the wires may be merely clamped in place in any suitable manner between their ends.

Figure 12:
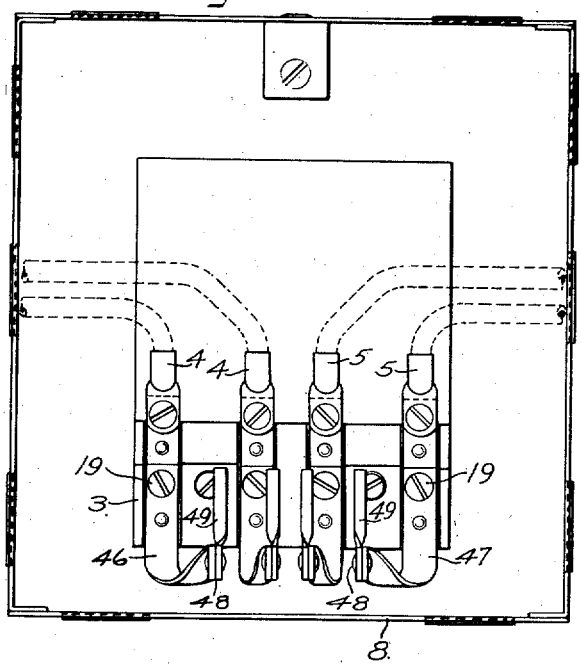
Fig. 12 is another view similar to Fig. 6 and showing another alternative embodiment of the invention.
Figure 13:
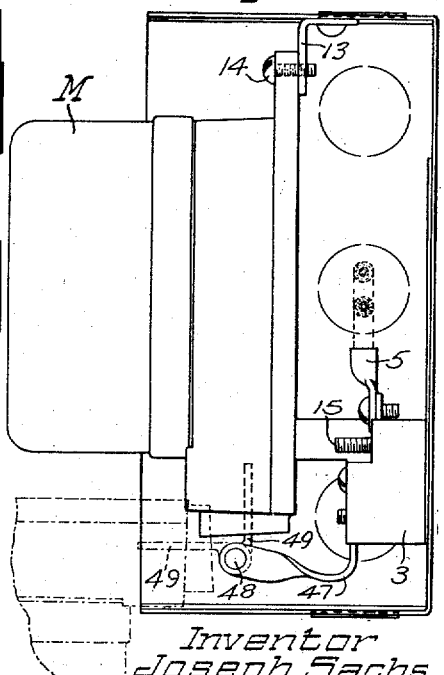
Fig. 13 is a side view of the parts shown in Fig. 12, the casing being shown in vertical section. In this view a portion of the meter is shown by full lines in normal position, and is shown by dot-and-dash lines in a position in which the front of the connection block is exposed.

The construction shown in Figs. 12 and 13 is similar to that shown in Figs. 1 to 5, with the exception that a hinged connection to the meter is shown instead of a flexible connection. In lieu of the conductors 16 and 17 there are provided conductors 46 and 47, each of which is bent and twisted to provide one element of a hinge at 48. The other element 49 of each hinge is adapted to be inserted into the meter and to engage a terminal thereof. The four hinges at 48, 48 have their axes in alignment and the meter can be swung from the position shown by full lines in Fig. 13 to the position shown by dot-and-dash lines in the same figure. Inasmuch as the hinge connection shown in Fig. 13 does not permit vertical movement of the meter, the supporting screw 14 must be entirely removed in order to permit the meter to be swung forward and downward. It will be understood that during such movement the electrical connection to the meter is maintained.

It will be understood that the several alternative features which I have shown and described may be combined in various ways, and that I do not limit myself to the particular combinations disclosed. It will also be understood that the features of construction shown and described may be combined with other features conventional in the art, such as fuses or switches.

What I claim is:

1. In an electric meter installation, the combination of an enclosing casing, an openable front cover for the casing having an opening therein of substantially the same size as the forward portion of the meter, a meter spaced forward from the rear wall of the casing and serving to substantially completely close the said opening in the cover which meter has at least the terminals thereof within the casing and behind a plane substantially through the front edges thereof, an insulating block in the casing near the rear thereof and fastened directly to the casing independently of the cover and independently of the meter, the said block being so located that a substantial portion thereof is between horizontal planes through the top and bottom of the meter, conductors on the block and within the casing having terminals adapted for electrical connection with circuit wires, the said conductors on the block being electrically connected respectively with said terminals of the meter when the meter is positioned as aforesaid, and meter holding means located at least in part behind the cover and within the casing and carried at least in part by the insulating block, the said holding means including two manually disconnectible parts within the casing and separate from the cover and the said holding means serving when the said parts are connected to provide a rigid mechanical connection between the meter and the rear part of the casing for resisting relative movement of the meter.

2. In an electric meter connection device, the combination of a casing adapted for at least partly enclosing a meter, an openable front cover for the casing constructed to permit the dials of the partly enclosed meter to be visible from the front, means additional to and independent of the cover for normally supporting the meter at the front of the casing and at least partly behind the plane of the main body of the cover, the said meter supporting means being releasable to permit the meter to be moved forward when the cover is open, an insulating block in the casing near the rear thereof and fastened directly to the casing independently of the cover and independently of the meter, a substantial portion of the said block being positioned between horizontal planes through the top and bottom of the meter, terminals on the block and within the casing adapted for electrical connection with circuit wires, and a plurality of conducting means normally entirely within the casing and behind a plane substantially through the front edges thereof and serving to electrically connect the aforesaid terminals on the block with the terminals of the meter, the said conducting means having their forward portions movable relatively to the block to permit the meter to be moved forward as aforesaid and the said conducting means being constructed to maintain the electrical connections with the meter when the meter is so moved.

3. In an electric meter installation, the combination of an enclosing casing, a meter at the front of the casing having its terminals at the bottom and within the casing and behind a plane substantially through the front edges thereof, an openable front cover for the casing constructed to permit the dials of the meter to be visible from the front, means additional to and independent of the cover for normally supporting the meter at the front of the casing with its terminals positioned as aforesaid, the said meter supporting means being releasable to permit the meter to be moved forward and downward to a position at an angle to its normal position when the cover is open, an insulating block in the casing near the rear thereof and fastened directly to the casing independently of the cover and independently of the meter, a substantial portion of the said block being between horizontal planes through the top and bottom of the meter, terminals on the block and within the casing adapted for electrical connection with circuit wires, and a plurality of flexible conductors normally entirely within the casing and connected to the block at points adjacent the said plane through the bottom of the meter, the said flexible conductors serving to electrically connect the aforesaid terminals on the block with the terminals of the meter and also serving while maintaining the said electrical connections with the meter to permit the meter after opening of the cover to be moved independently of the cover forward and downward as aforesaid.

4. In an electric meter connection appliance, the combination of an enclosing casing openable at the front, an insulating block at the rear of the casing having a portion at its front adapted to directly engage a meter, terminals on the block adapted for electrical connection with circuit wires, a bracket in the casing having means thereon for releasably supporting a meter in front of the said block and in engagement with the front portion thereof, and a plurality of conducting means adapted to electrically connect the terminals of the meter with the aforesaid terminals on the block which conducting means have their forward portions movable relatively to the block while maintaining the electrical connections with the meter so as to permit the meter when released to swing out of engagement with the block to a position partly outside of the casing and at an angle to its normal position with the block exposed.

5. The combination in an electric meter connection device, of a rear insulating block, terminals on the block adapted for electrical connection respectively with stationary circuit wires, releasable means for normally supporting a meter in front of the said block, and a plurality of hinged conductors adapted to electrically connect the terminals of the meter with the aforesaid circuit wire connectible terminals on the block and to permit the meter when released and while electrically connected to swing forward about the hinge axis to a position at an angle to its normal position.

6. The combination in an electric meter connection device, of a rear insulating block, terminals on the block adapted for electrical connection respectively with line wires and with load wires, releasable means for normally supporting a meter in front of the said block, and a plurality of hinged conductors adapted to electrically connect the terminals of the meter with the aforesaid terminals on the block and to permit the meter when released and while electrically connected to swing forward about the hinge axis to a position at an angle to its normal position.

JOSEPH SACHS.

CERTIFICATE OF CORRECTION.

Patent No. 2,120,574. June 14, 1938.

JOSEPH SACHS.

It is hereby certified that error appears in the printed specification of the above numbered patent requiring correction as follows: Page 1, second column, line 42, for the word "enclosed" read enclosing; page 2, first column, line 36, before "Provision" insert the following sentence:

Solder lug terminals are shown, but I do not so limit myself.;

page 4, first column, line 32, for "Figs." read Fig.; and that the said Letters Patent should be read with these corrections therein that the same may conform to the record of the case in the Patent Office.

Signed and sealed this 19th day of July, A. D. 1938.

Henry Van Arsdale,
ting Commissioner of Patents.

(Seal)

the cover is open, an insulating block in the casing near the rear thereof and fastened directly to the casing independently of the cover and independently of the meter, a substantial portion of the said block being between horizontal planes through the top and bottom of the meter, terminals on the block and within the casing adapted for electrical connection with circuit wires, and a plurality of flexible conductors normally entirely within the casing and connected to the block at points adjacent the said plane through the bottom of the meter, the said flexible conductors serving to electrically connect the aforesaid terminals on the block with the terminals of the meter and also serving while maintaining the said electrical connections with the meter to permit the meter after opening of the cover to be moved independently of the cover forward and downward as aforesaid.

4. In an electric meter connection appliance, the combination of an enclosing casing openable at the front, an insulating block at the rear of the casing having a portion at its front adapted to directly engage a meter, terminals on the block adapted for electrical connection with circuit wires, a bracket in the casing having means thereon for releasably supporting a meter in front of the said block and in engagement with the front portion thereof, and a plurality of conducting means adapted to electrically connect the terminals of the meter with the aforesaid terminals on the block which conducting means have their forward portions movable relatively to the block while maintaining the electrical connections with the meter so as to permit the meter when released to swing out of engagement with the block to a position partly outside of the casing and at an angle to its normal position with the block exposed.

5. The combination in an electric meter connection device, of a rear insulating block, terminals on the block adapted for electrical connection respectively with stationary circuit wires, releasable means for normally supporting a meter in front of the said block, and a plurality of hinged conductors adapted to electrically connect the terminals of the meter with the aforesaid circuit wire connectible terminals on the block and to permit the meter when released and while electrically connected to swing forward about the hinge axis to a position at an angle to its normal position.

6. The combination in an electric meter connection device, of a rear insulating block, terminals on the block adapted for electrical connection respectively with line wires and with load wires, releasable means for normally supporting a meter in front of the said block, and a plurality of hinged conductors adapted to electrically connect the terminals of the meter with the aforesaid terminals on the block and to permit the meter when released and while electrically connected to swing forward about the hinge axis to a position at an angle to its normal position.

JOSEPH SACHS.

---

CERTIFICATE OF CORRECTION.

Patent No. 2,120,574. June 14, 1938.

JOSEPH SACHS.

It is hereby certified that error appears in the printed specification of the above numbered patent requiring correction as follows: Page 1, second column, line 42, for the word "enclosed" read enclosing; page 2, first column, line 36, before "Provision" insert the following sentence:

Solder lug terminals are shown, but I do not so limit myself.;

page 4, first column, line 32, for "Figs." read Fig.; and that the said Letters Patent should be read with these corrections therein that the same may conform to the record of the case in the Patent Office.

Signed and sealed this 19th day of July, A. D. 1938.

Henry Van Arsdale,
ting Commissioner of Patents.

(Seal)

CERTIFICATE OF CORRECTION.

Patent No. 2,120,574. June 14, 1938.

JOSEPH SACHS.

It is hereby certified that error appears in the printed specification of the above numbered patent requiring correction as follows: Page 1, second column, line 42, for the word "enclosed" read enclosing; page 2, first column, line 36, before "Provision" insert the following sentence:

Solder lug terminals are shown, but I do not so limit myself.;

page 4, first column, line 32, for "Figs." read Fig.; and that the said Letters Patent should be read with these corrections therein that the same may conform to the record of the case in the Patent Office.

Signed and sealed this 19th day of July, A. D. 1938.

Henry Van Arsdale,
ting Commissioner of Patents.

(Seal)